United States Patent
Kabashima et al.

(10) Patent No.: US 7,586,283 B2
(45) Date of Patent: Sep. 8, 2009

(54) MAGNETIC ENCODER DEVICE AND ACTUATOR

(75) Inventors: Takefumi Kabashima, Fukuoka (JP); Ryuichiro Tominaga, Fukuoka (JP); Kazutoshi Imai, Fukuoka (JP); Yuji Arinaga, Fukuoka (JP); Motomichi Ohto, Fukuoka (JP); Hirotoshi Hayakawa, Saitama (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 272 days.

(21) Appl. No.: 10/576,532

(22) PCT Filed: Oct. 21, 2004

(86) PCT No.: PCT/JP2004/015592

§ 371 (c)(1),
(2), (4) Date: Jan. 24, 2007

(87) PCT Pub. No.: WO2005/040729

PCT Pub. Date: May 6, 2005

(65) Prior Publication Data

US 2007/0164733 A1     Jul. 19, 2007

(30) Foreign Application Priority Data

Oct. 24, 2003     (JP) .................. P. 2003-364321

(51) Int. Cl.
*G05B 19/29* (2006.01)

(52) U.S. Cl. ...................................... 318/603; 318/602

(58) Field of Classification Search ................ 318/603, 318/602, 727

See application file for complete search history.

(56) References Cited

U.S. PATENT DOCUMENTS

| | | | | |
|---|---|---|---|---|
| 5,625,289 A | * | 4/1997 | Daetz et al. | 324/207.14 |
| 6,130,535 A | * | 10/2000 | Herden et al. | 324/207.2 |
| 6,160,499 A | * | 12/2000 | Arinaga et al. | 341/15 |
| 6,472,865 B1 | * | 10/2002 | Tola et al. | 324/207.2 |
| 2004/0066183 A1 | * | 4/2004 | Lohberg et al. | 324/166 |

FOREIGN PATENT DOCUMENTS

| | | |
|---|---|---|
| JP | 53-128353 A | 11/1978 |
| JP | 9-14908 A | 1/1997 |
| JP | 9-243401 A | 9/1997 |
| JP | 2000-346611 A | 12/2000 |
| JP | 2003-310722 A | 10/2002 |
| JP | 2003-240598 A | 8/2003 |
| WO | WO 99/13296 A1 | 3/1999 |

\* cited by examiner

*Primary Examiner*—Rina I Duda
(74) *Attorney, Agent, or Firm*—Sughrue Mion, PLLC (57) ABSTRACT

Provided is a magnetic encoder device capable of detecting a rotating angle of an actuator having a cavity structure.

The magnetic encoder device includes a ring-shaped rotating body 11, a ring-shaped permanent magnet 12 which is inscribed in and fixed to an inner circumferential side of the ring-shaped rotating body 11 and magnetized in a direction perpendicular to a center axis of the rotating body 11, and a fixed body 13 which is disposed on an inner circumferential side of the permanent magnet 12 through an air gap and has a circular circumference and a cavity, and a magnetic field detecting element 14 disposed on an outer circumferential side of the fixed body 13 through the permanent magnet 12 and the air gap.

15 Claims, 9 Drawing Sheets

NO LEAD HOLE    LEAD HOLE: 0 DEGREE    LEAD HOLE: 45 DEGREE

MAGNETIC ENCODER DEVICE AND ACTUATOR

FIELD OF THE INVENTION

The present invention relates to a magnetic encoder device for detecting a rotating position of a rotating body and an actuator including the magnetic encoder, and more particularly, to a magnetic encoder device and an actuator having a cavity.

DESCRIPTION OF THE RELATED ART

Conventionally, in order to detect a rotating angle of a rotating body such as a shaft of a motor, there is provided a magnetic encoder device in which a bipolar permanent magnet having a circular plate shape is fixed to the rotating body, a magnetic field from the permanent magnet having the circular plate shape is detected by a magnetic field detecting element, and an absolute position of the rotating body is detected (see International Publication No. WO99/013296 (p4-p5 and FIG. 1)).

Figure 17:
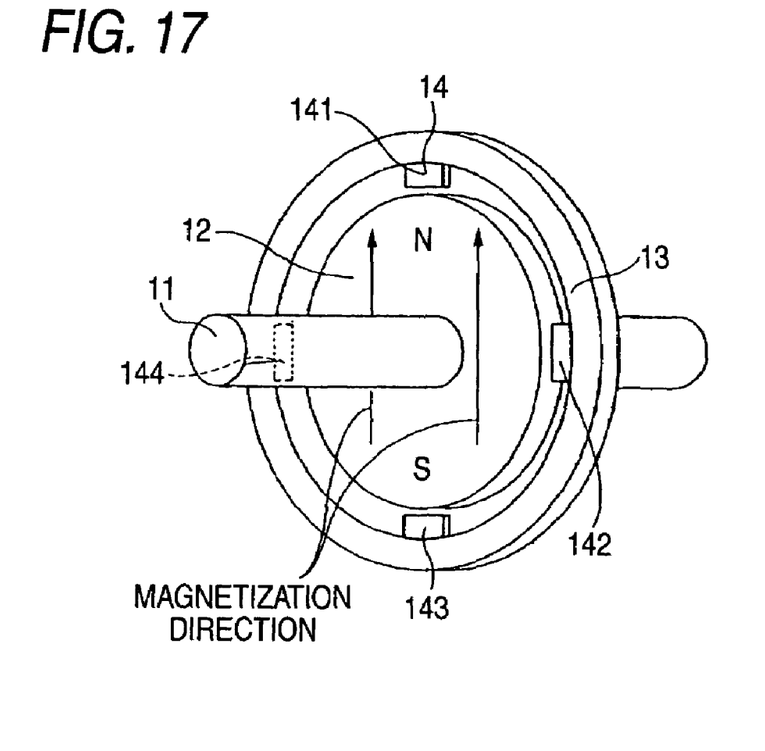
FIG. 17 is a perspective view of a conventional magnetic encoder device.

FIG. 17 is a perspective view of a conventional magnetic encoder device.

In FIG. 17, reference numeral 11 denotes a rotating body (shaft) and reference numeral 12 denotes a permanent magnet which has a circular plate shape and is fixed to the rotating body 11 such that its rotation axis is equal to the rotating body. The permanent magnet having the circular plate shape is magnetized in parallel to a direction perpendicular to the axis of the rotating body 11. Reference numeral 13 denotes a ring-shaped fixed body provided at an outer circumferential side of the permanent magnet 12 and reference numeral 14 denotes four magnetic field detecting elements which are mounted on the fixed body 13 at an interval of 90° in a circumferential direction, in which an A1-phase detecting element 141 and a B1-phase detecting element 142 which face an outer circumferential surface of the permanent magnet 12 through an air gap and are deviated from each other by a phase of 90° in a mechanical angle are provided, an A2-phase detecting element 143 which is deviated from the A1-phase detecting element 141 by a phase of 180° in the mechanical angle is provided, and a B2-phase detecting element 144 which is deviated from the B1-phase detecting element 142 by a phase of 180° in the mechanical angle is provided.

DISCLOSURE OF THE INVENTION

Problems to be Solved by the Invention

An actuator used in a robot requires a cavity structure through which a power line or a signal line passes. Thus, an outer rotor type actuator is used. Accordingly, a magnetic encoder device for detecting a rotating angle of a rotating body also requires a cavity structure. However, in the conventional magnetic encoder device, since the permanent magnet fixed to the shaft rotates and a signal is detected by the magnetic field detecting element which is mounted on the fixed body and faces the permanent magnet, a cavity cannot be formed in a center of the magnetic encoder device. Accordingly, it is difficult to apply the magnetic encoder device to an actuator having a cavity structure.

In addition, when a magnetic encoder is mounted in a cavity actuator including an electronic brake therein, the actuator lengthens in an axial direction. Thus, it is difficult to miniaturize the actuator. Furthermore, the number of parts increases and thus assembling cost increases.

The present invention is to solve such problems, and an object of the present invention is to provide a magnetic encoder device which is applicable to an actuator having a cavity structure, and a small-sized actuator which includes a small number of parts, and the magnetic encoder and an electronic brake having a cavity structure.

Means for Solving the Problems

In order to solve the problems, the present invention is configured as follows.

According to a first aspect of the present invention, there is provided with a magnetic encoder device including: a magnetic encoder including a permanent magnet fixed to a rotating body and a magnetic field detecting element which faces the permanent magnet through an air gap and is fixed to a fixed body, and a signal processing circuit which processes a signal from the magnetic field detecting element, wherein the rotating body has a ring shape, the permanent magnet has a ring shape, is inscribed in and fixed to an inner circumferential side of the rotating body and magnetized in parallel to a direction perpendicular to a center axis of the rotating body, the fixed body has a circular outer circumference and a cavity and is disposed at an inner circumferential side of the permanent magnet through the air gap, and the magnetic field detecting element is disposed on an outer circumferential side of the fixed body through the permanent magnet and the air gap.

In addition, according to a second aspect of the present invention, there is provided with the magnetic encoder device according to the first aspect, wherein the permanent magnet has parallel anisotropy and is magnetized to two poles.

In addition, according to a third aspect of the present invention, there is provided with the magnetic encoder device according to the first or second aspect, wherein the rotating body is made of a magnetic material.

In addition, according to a fourth aspect of the present invention, there is provided with the magnetic encoder device according to any one of the first to third aspects, wherein the fixed body is made of a magnetic material.

In addition, according to a fifth aspect of the present invention, there is provided with the magnetic encoder device according to the forth aspect, wherein the magnetic material is made of sintered soft magnetic powdered material.

In addition, according to a sixth aspect of the present invention, there is provided with the magnetic encoder device according to the forth aspect, wherein the magnetic material is formed by laminating a soft magnetic material.

In addition, according to a seventh aspect of the present invention, there is provided with the actuator having a cavity and including an electronic motor and an electronic brake, wherein the actuator includes the magnetic encoder according to the first aspect.

In addition, according to an eighth aspect of the present invention, there is provided with the actuator according to the seventh aspect, wherein the fixed body of the magnetic encoder also functions as a portion of a magnetic yoke of the electronic brake.

In addition, according to a ninth aspect of the present invention, there is provided with the actuator according to the seventh aspect, wherein the fixed body of the magnetic encoder has a structure fitted to a magnetic yoke of the electronic brake.

In addition, according to a tenth aspect of the present invention, there is provided with the actuator according to the seventh aspect, wherein a magnetic shield is disposed between the electronic motor or the electronic brake and the magnetic encoder.

In addition, according to an eleventh aspect of the present invention, there is provided with the actuator according to the seventh aspect, wherein a lead hole through which a power supply lead of the electronic brake passes is formed in the fixed body of the magnetic encoder.

In addition, according to a twelfth aspect of the present invention, there is provided with the actuator according to the seventh aspect, wherein a notch portion through which a power supply lead of the electronic brake passes is formed in an inner circumferential side of the fixed body of the magnetic encoder.

In addition, according to a thirteenth aspect of the present invention, there is provided with the actuator according to the eleventh or twelfth aspect, wherein the lead hole and the notch portion are disposed on a line for connecting a center of the fixed body to the magnetic field detecting element mounted on the fixed body.

In addition, according to a fourteenth aspect of the present invention, there is provided with the actuator according to the seventh aspect, wherein the lead hole is disposed at an inner circumferential side of the fixed body.

Effect of the Invention

According to the first aspect, since the rotating body has the ring shape, the permanent magnet has the ring shape, is inscribed in and fixed to an inner circumferential side of the rotating body and magnetized in parallel to a direction perpendicular to a center axis of the rotating body, and the fixed body has a circular outer circumference and a cavity and is disposed at an inner circumferential side of the permanent magnet through the air gap, and the magnetic field detecting element is fixed to an outer circumferential side of the fixed body, it is possible to realize a magnetic encoder device with a cavity structure, which has a simple structure, low cost, a small size, and slimness, high precision having an absolute vale and to detect a detecting angle of an actuator having a cavity structure.

Furthermore, when the magnet having parallel anisotropy is used, the magnet can be easily and precisely magnetized in a signal direction using a simple magnetization device.

When the magnetic material is used in the rotating body, use permeance of the magnet is large and a generated magnetic field becomes stronger. In addition, a large output signal can be obtained from the magnetic field detecting element. Furthermore, since effect for shielding an external magnetic field is also realized, it is possible to reduce external magnetic noise and to increase an S/N ratio.

In addition, when the magnetic material is used in the fixed body, the use permeance of the magnet is large and the generated magnetic field becomes stronger. In addition, a large output signal can be obtained from the magnetic field detecting element.

In addition, when the magnetic material is made of sintered soft magnetic powdered material, eddy current is suppressed from being generated in the fixed body. Thus, it is possible to realize a magnetic encoder device which can detect the rotating angle with high precision from low-speed rotation to high-speed rotation. Furthermore, since the sintered material can be manufactured by a batch molding process using a mold, it is possible to reduce manufacturing and assembling cost and to realize a chip encoder device. In addition, since breaking is facilitated, recycle is possible. Accordingly, it is possible to realize a magnetic encoder device having a small environment load.

In addition, when the magnetic material is formed by laminating the soft magnetic material, it is possible to realize a magnetic encoder device which can detect the rotating angle with high precision, without generating the eddy current in the fixed body, regardless of the rotating speed.

Furthermore, according to the seventh aspect, since the magnetic encoder having the cavity applies to an actuator having a cavity and including and an electronic brake, it is possible to realize an actuator having a cavity and including an electronic brake.

In addition, when the fixed body of the magnetic encoder also functions as a portion of a magnetic yoke of the electronic brake, the length of the actuator in an axial direction becomes shorter and thus the actuator can be miniaturized. Thus, since the number of parts is reduced, the manufacturing and assembling cost is reduced and reliability is improved.

When the fixed body of the magnetic encoder has a structure fitted to a magnetic yoke of the electronic brake, assembling is facilitated. In addition, it is possible to easily mount the magnetic field detecting element on the fixed body with high precision.

Furthermore, when the magnetic shield is disposed between the electronic motor or the electronic brake and the magnetic encoder, it is possible to block external magnetic field noise or magnetic field generated at the motor or the electronic brake and to improve noise resistance of the magnetic encoder.

In addition, when the lead hole through which a power supply lead of the electronic brake passes is formed in the fixed body, it is possible to pull the power supply lead line out of the actuator through the lead hole. To this end, a space in which the lead line is wound is unnecessary and thus the actuator can be miniaturized in the axial direction and assembling is facilitated. Furthermore, since the lead line is not bent, reliability of the lead line is improved.

Furthermore, when the notch portion is formed in an inner circumferential side of the fixed body of the magnetic encoder, the lead line of the electronic brake can pass through the notch portion by a simple process, without deteriorating the precision of the magnetic encoder.

In addition, when the lead hole and the notch portion is disposed on a line for connecting a center of the fixed body to the magnetic field detecting element mounted on the fixed body, it is possible to reduce deterioration of the precision of the magnetic encoder due to formation of the lead hole or the notch portion.

Furthermore, when the lead hole is disposed at an inner circumferential side of the fixed body, it is possible to more reduce the deterioration of the precision of the magnetic encoder due to the formation of the lead hole.

REFERENCE NUMERALS

10: magnetic encoder
11: rotating body
12: permanent magnet
13: fixed body
131: lead hole
132: notch portion
14: magnetic field detecting element
141: A1-phase detecting element
142: B1-phase detecting element
143: A2-phase detecting element
144: B2-phase detecting element
15: signal processing circuit
151, 152: differential amplifier
211: stator yoke
212: armature winding
22: rotor
221: motor field permanent magnet
222: rotor yoke
30: electronic brake
153: angle computing circuit
16: magnetic shield
20: motor
21: stator
31: field
311: brake yoke
312: brake coil
313: power supply lead
32: armature
33: spring
34: brake friction plate
35: brake disk
50: actuator fixed-body
60: coupling member

BEST MODE FOR CARRYING OUT THE INVENTION

Hereinafter, exemplary embodiments according to the invention will be described with reference to the accompanying drawings.

FIRST EMBODIMENT

Figure 1:
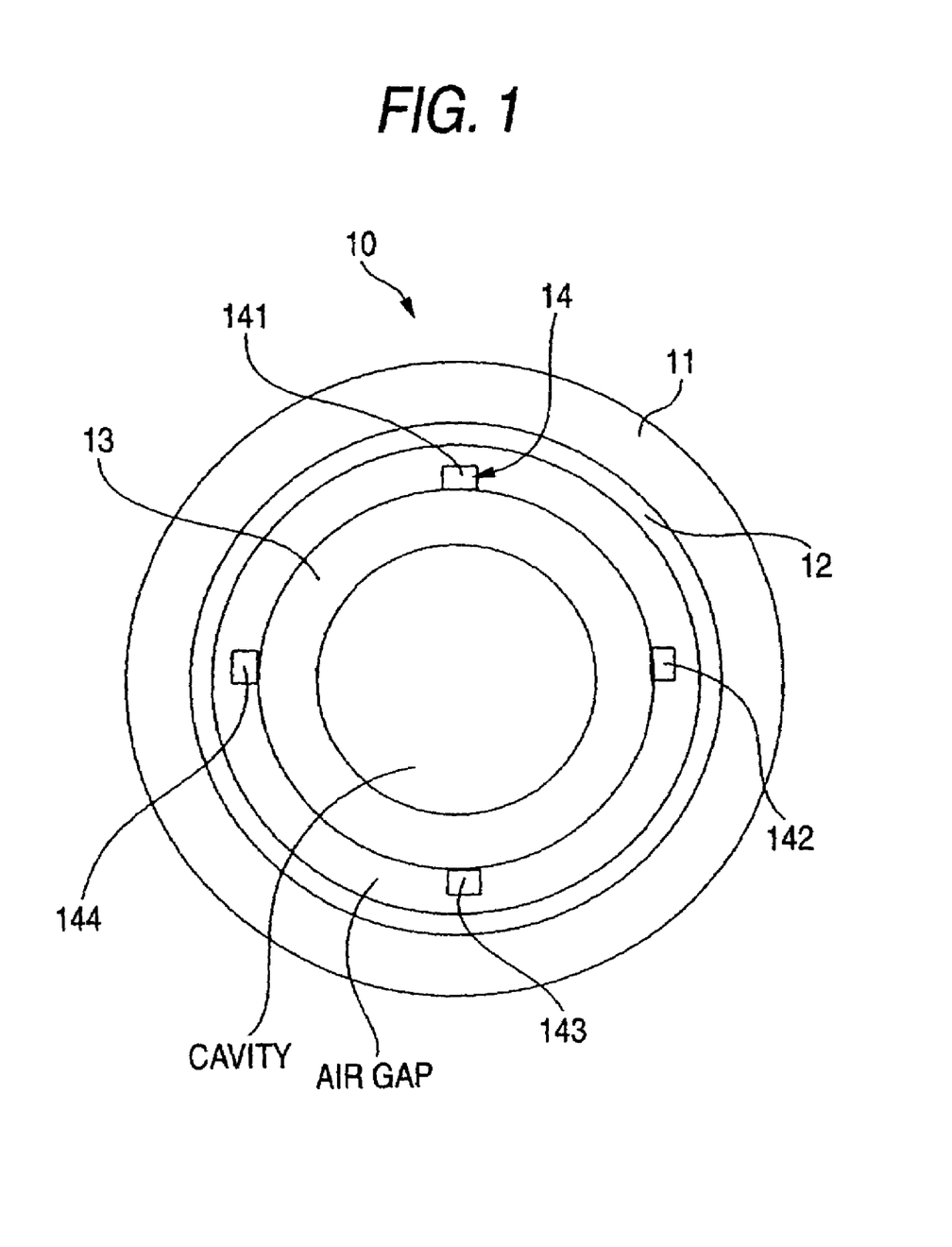
FIG. 1 is a cross-sectional view showing a structure of a magnetic encoder device according to the present invention.

FIG. 1 is a cross-sectional view showing a structure of a magnetic encoder device according to the present invention.

In FIG. 1, reference numeral 11 denotes a ring-shaped rotating body made of a magnetic material and reference numeral 12 denotes a ring-shaped permanent magnet which is inscribed in and fixed to an inner circumferential side of the rotating body 11 and magnetized in parallel to a direction perpendicular to a center axis of the rotating body 11. Reference numeral 13 denotes a fixed body having a circular outer circumference and made of a magnetic material having a cavity. In addition, reference numeral 14 is a magnetic field detecting element which faces an inner circumferential side of the magnet 12 through an air gap and is fixed to the outer circumferential side of the fixed body 13. By this structure, a center portion of the fixed body 13, that is, a center portion of the magnetic encoder device, is hollow.

An example of the structure of the magnetic encoder device is as follows.

The rotating body 11 is made of a magnetic material SS41 having an outer diameter of 50 mm and a cavity diameter of 20 mm, and the permanent magnet 12 is made of a ring-shaped SmCo-based magnet having parallel anisotropy and an outer diameter of 40 mm. In addition, the fixed body 13 is made of S45C and the magnetic field detecting element 14 is made of a hall element.

Next, an operation of the magnetic encoder device according to the present invention will be described.

When the rotating body 11 rotates, the permanent magnet 12 also rotates. By a change in a magnetic field of the permanent magnet 12, one cycle of a sine wave signal is output from the magnetic field detecting element 14 by one rotation of the rotating body 11.

Figure 2:
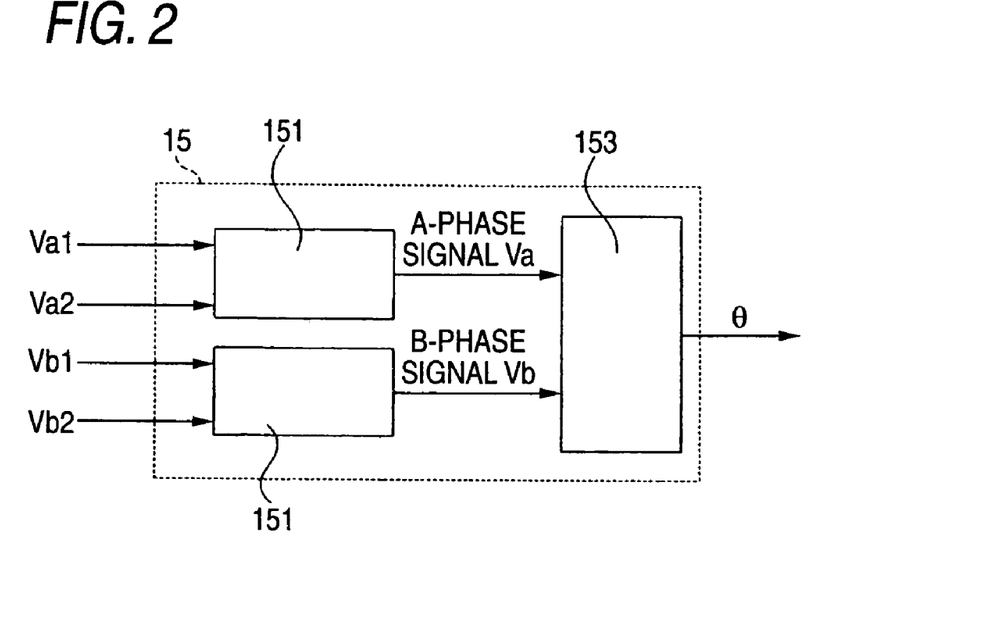
FIG. 2 is a block diagram of a signal processing circuit.

FIG. 2 is a block diagram of a signal processing circuit, which processes and converts the signal from the magnetic field detecting element 14 into an angle signal θ. In FIG. 2, reference numerals 151 and 152 denote differential amplifiers and reference numeral 153 denotes an angle computing circuit. Respective detecting signals Va1 and Va2 from an A1-phase detecting element 141 and an A2-phase detecting element 143 which are deviated from each other by 180° are input to the differential amplifier 151 to obtain an A-phase signal Va which is a differential signal between the both signals. Similarly, respective detecting signals Vb1 and Vb2 from a B1-phase detecting element 142 and a B2-phase detecting element 144 which are deviated from each other by 180° are input to the differential amplifier 152 to obtain a B-phase signal Vb which is a differential signal between the both signals.

Figure 3:
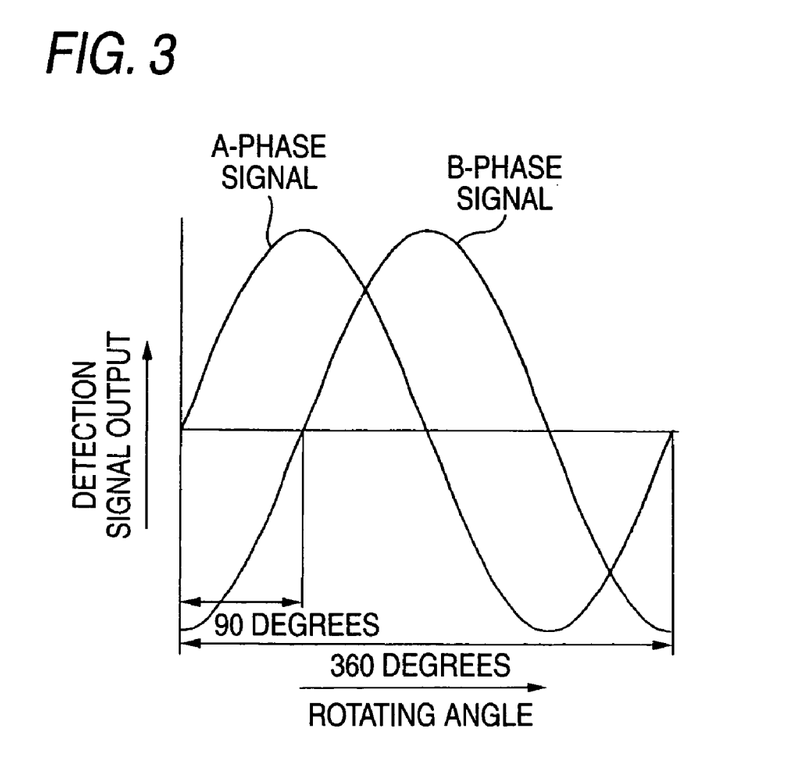
FIG. 3 is a view explaining an output of a magnetic field detecting element.

FIG. 3 is a view explaining an output of the magnetic field detecting element and shows waveforms of the A-phase signal Va and the B-phase signal Vb. The phases of the A-phase signal Va and the B-phase signal Vb are different by a phase of 90° due to the arrangement of the detecting elements.

The A-phase signal Va and the B-phase signal Vb are input to the angle computing circuit 153 to obtain the angle signal θ by a computing process of arctan(Va/Vb).

Next, characteristics of the magnetic encoder device according to the present invention will be described.

The magnetic encoder device according to the present invention and a reference encoder device (resolution: 1,050,000 PPR) are coupled to each other and externally rotated and a detection angle of the magnetic encoder device of the present invention and a detection angle of the reference encoder device are measured and compared with each other.

Figure 4:
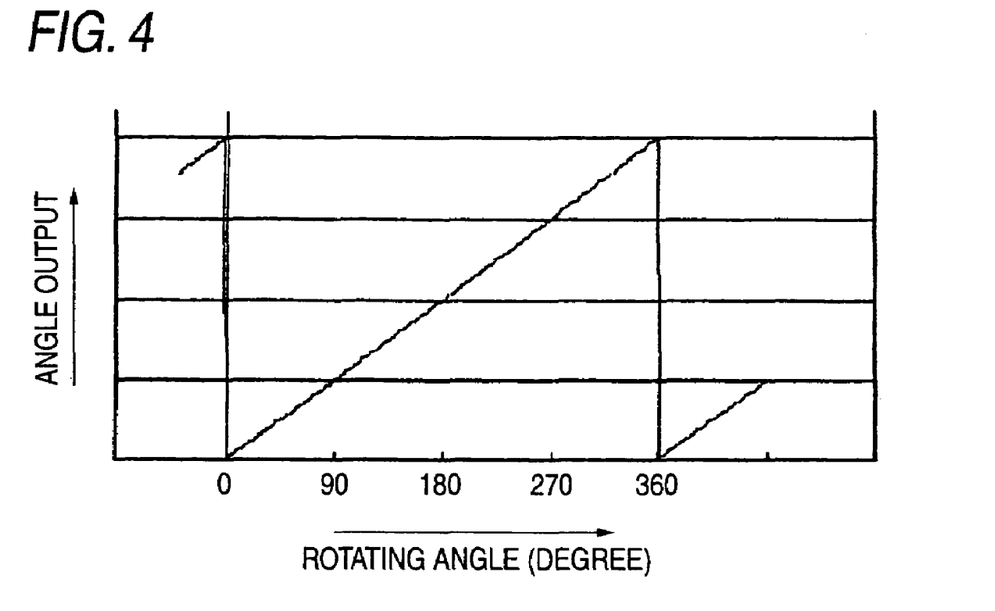
FIG. 4 is a view explaining an output of the signal processing circuit.
Figure 5:
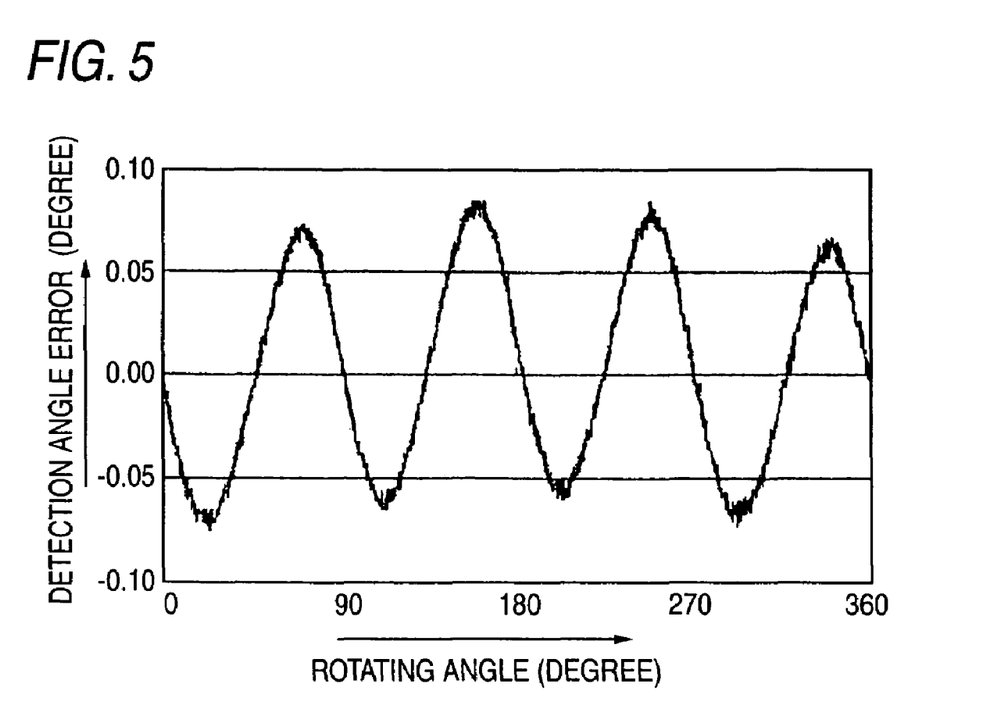
FIG. 5 is a view explaining a detection angle error.

FIG. 4 is a view explaining an output of the signal processing circuit and shows an angle output of the signal processing circuit 15 when the rotating body 11 rotates. In addition, FIG. 5 is a view explaining a detection angle error and shows an angle error between the magnetic encoder device according to the present invention and the reference encoder. As can be seen from FIG. 5, the magnetic encoder device according the present invention has high performance such as the angle error of 0.08° and precision of 12 bits.

Furthermore, although, in the present embodiment, the permanent magnet 12 made of SmCo-based magnet is described, a NeFeB-based magnet, a bond magnet, or a ferrite magnet has the same effect, regardless of the material of the magnet. In addition, although the materials of the rotating body 11 and the fixed body 13 are the magnetic materials SS41 and S45C, respectively, the other magnetic materials may be used. Furthermore, the shape of the cavity of the fixed body 13 may not be circular. Although the hall element is used as the magnetic field detecting element 14, a magnetic resistance element has the same effect.

SECOND EMBODIMENT

In the present embodiment, in the fixed body 13, a magnetic block material such as a mechanical structural material S45C used in the first embodiment is replaced with a sintered soft magnetic material.

The sintered soft magnetic material is obtained by coating iron powder having a diameter of several tens μm with an insulating film having a thickness of several hundreds nm and hardening the iron with a binder. Thus, powders are insulated from one another.

Here, a phenomenon that eddy current is generated and influence of the eddy current on precision will be described.

Figure 6:
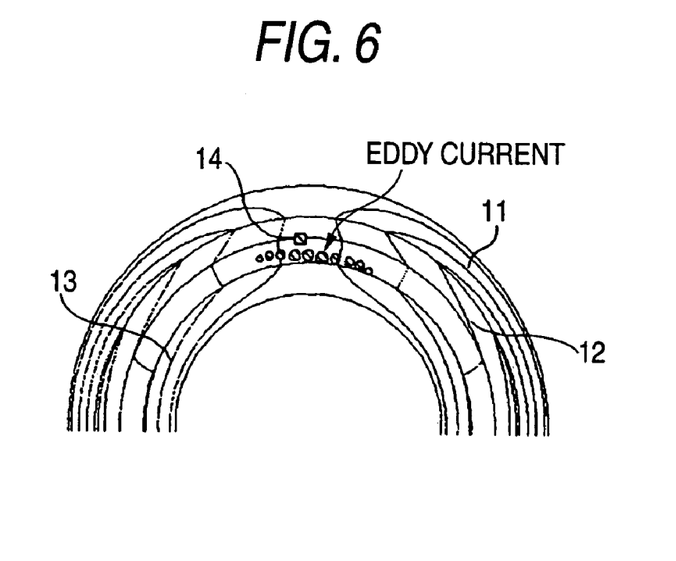
FIG. 6 is a view explaining generation of eddy current.

FIG. 6 is a view explaining generation of eddy current.

As shown in FIG. 6, a rotating magnetic field of the permanent magnet 12 passes through the fixed body 13 configuring a magnetic circuit. When the permanent magnet 12 fixed to the rotating body 11 rotates, the eddy current is generated in the vicinity of the surface of the fixed body in a direction for preventing a magnetic flux change in the fixed body 13 from being generated. The size of the eddy current is proportional to magnetic flux introduced into the fixed body, a radius of the fixed body, and a product of a rotating speed and electrical conductance of the fixed body. In addition, whether the permanent magnet rotates forwardly or reversely, the phase of the eddy current is slower than that of the rotating magnetic field and thus the magnetic flux introduced into the fixed body is reduced. Accordingly, the precision of the encoder deteriorates.

In other words, when the magnetic block material such as the mechanical structural material S45C is used in the fixed body 13, the rotating magnetic field is influenced by the eddy current. Thus, the phase of the detection signal is changed and an output voltage is reduced. In addition, it can be seen that the influence increase depending on the number of the rotations.

In the present embodiment, since the sintered soft magnetic material is used in the fixed body 13 and the soft magnetic powders of the sintered soft magnetic material are electrically insulated from one another, the eddy current which has influence on the precision of the encoder is not generated.

When the angle error due to the eddy current is measured up to 5000 $min^{-1}$ using the rotating speed as a parameter, the angle error is less than a measurement error.

THIRD EMBODIMENT

Figure 7:
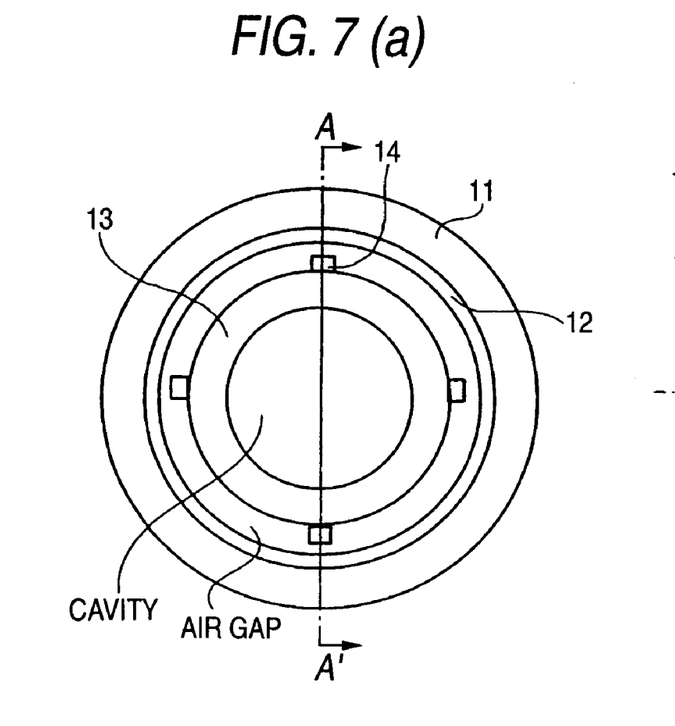
FIG. 7 is a cross-sectional view showing a structure of a magnetic encoder device according to a third embodiment of the present invention.

FIG. 7(a) is a cross-sectional view showing a structure of a magnetic encoder device according to a third embodiment of the present invention, and FIG. 7(b) is a cross-sectional view taken along line A-A'.

The present embodiment is different from the first embodiment in that the fixed body 13 is made of the material S45C in the first embodiment, whereas the fixed body 13 is configured by laminating a silicon steel plate which is a thin plate made of a soft magnetic material and coated with an insulating material in the present embodiment.

FOURTH EMBODIMENT

Figure 8:
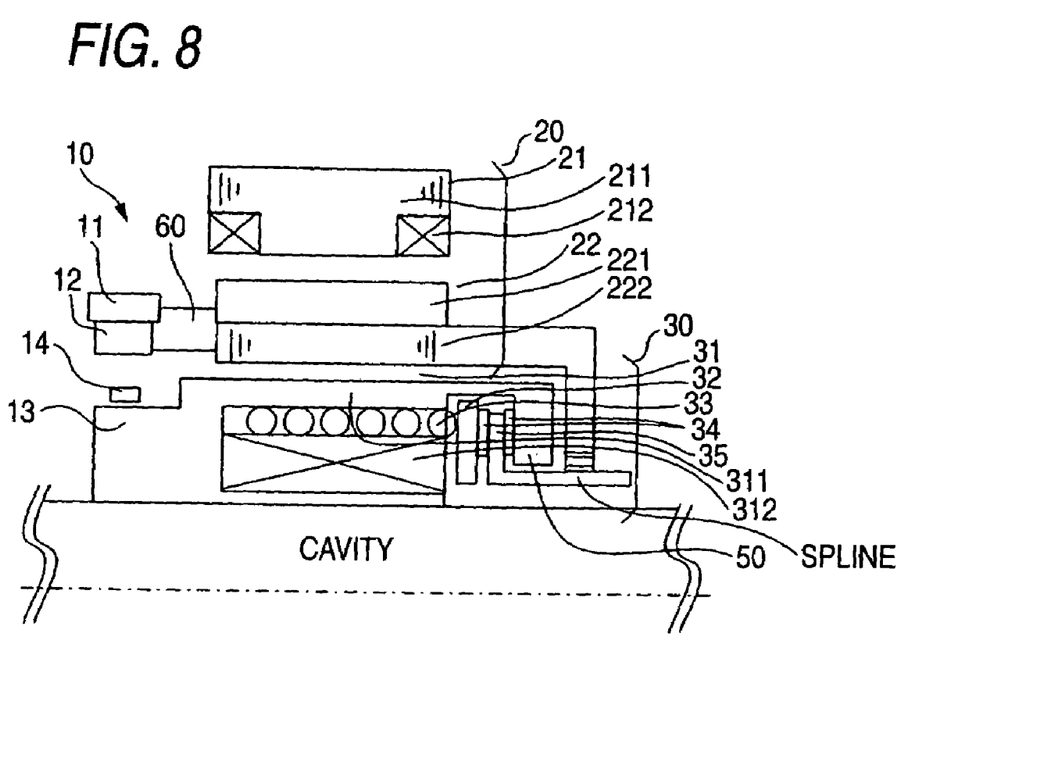
FIG. 8 is a cross-sectional view showing a structure of a cavity actuator according to a fourth embodiment of the present invention.

FIG. 8 is a cross-sectional view showing a structure of a cavity actuator according to a fourth embodiment of the present invention.

In FIG. 8, reference numeral 10 denotes a magnetic encoder, reference numeral 20 denotes a motor, and reference numeral 30 denotes an electronic brake. The motor 20 includes a stator 21 including a stator yoke 211 and an armature winding 212 and a rotor 22 including a motor field permanent magnet 221 and a rotor yoke 222. In addition, the electronic brake 30 includes a field 31, an armature 32, a spring 33, a brake friction plate 34, and a brake disk 35. The field 31 includes a brake yoke 311 and a brake coil 312. Furthermore, the armature 32 can be moved in an axial direction.

In addition, in the rotating body 11 of the magnetic encoder 10, a non-magnetic coupling member 60 is coupled to the rotor 22 of the motor 20 and detects a rotating position of the rotor 22. Furthermore, the fixed body 13 of the magnetic encoder 10 also functions as a portion of the brake yoke 311 of the electronic brake 30. The structure of the magnetic encoder 10 is similar to that of the first embodiment except that a portion of the brake yoke 311 of the electronic brake 30 also functions as the fixed body 13 of the magnetic encoder 10.

Here, an operation of the electronic brake will be described.

When the electronic brake 30 is not energized, the spring 33 presses the armature 32 and an actuator fixed-body 50 presses the brake disk 35 which can be moved in the axial direction by a spline through the brake friction plate 34. Thus, the rotor 22 cannot be rotated. However, when the electronic brake 30 is energized, an electromagnetic force acts between the field 31 and the armature 32 and the armature 32 is attracted to the brake yoke 311. Accordingly, the brake friction plate 34 becomes free and thus the rotor 22 of the motor 20 can freely rotate.

As described above, in the present embodiment, the portion of the brake yoke of the electronic brake is used as and integrally formed with the fixed body of the magnetic encoder.

FIFTH EMBODIMENT

Figure 9:
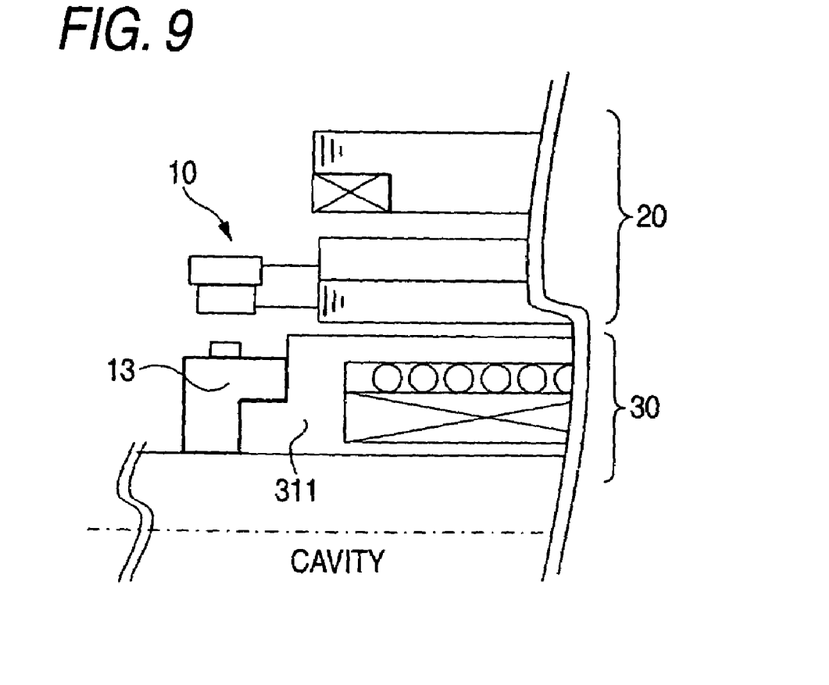
FIG. 9 is a cross-sectional view showing a structure of a cavity actuator according to a fifth embodiment of the present invention.

FIG. 9 is a cross-sectional view showing a structure of a cavity actuator according to a fifth embodiment of the present invention.

In the drawing, reference numeral 13 denotes a fixed body which is formed to be fitted to the brake yoke 311.

The present embodiment is different from the fourth embodiment in that the fixed body 13 of the magnetic encoder is integrally formed with the brake yoke 311 in the fourth embodiment, whereas the fixed body 13 is formed to be fitted to the brake yoke 311 in the present embodiment. For example, the fixed body 13 may be made of a sintered soft magnetic material and the magnetic yoke 311 may be made of S10C.

SIXTH EMBODIMENT

Figure 10:
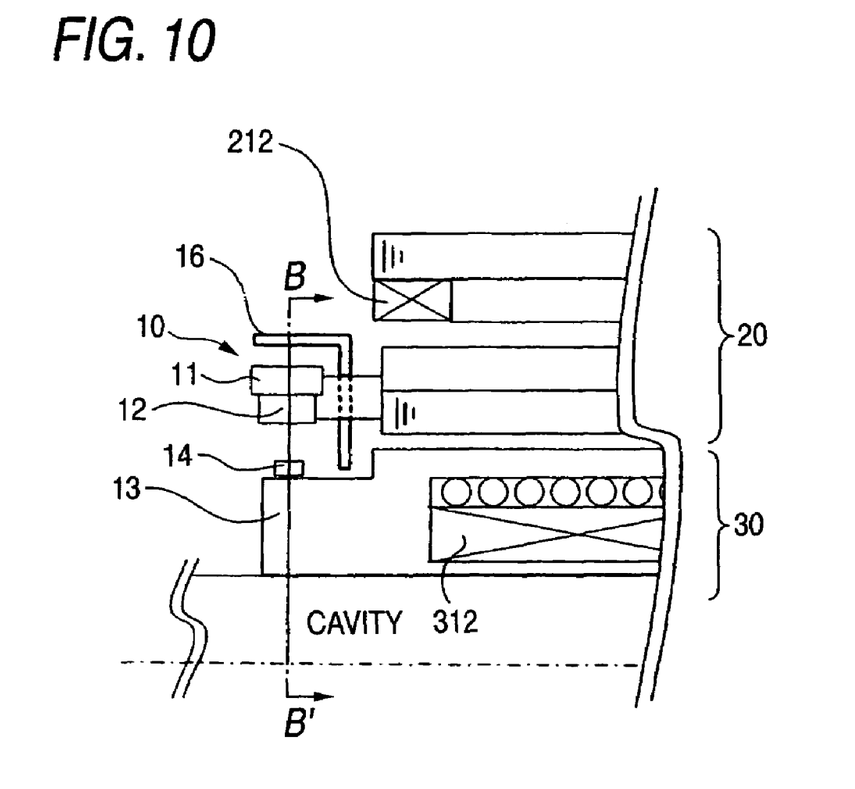
FIG. 10 is a cross-sectional view showing a structure of a cavity actuator according to a sixth embodiment of the present invention.
Figure 11:
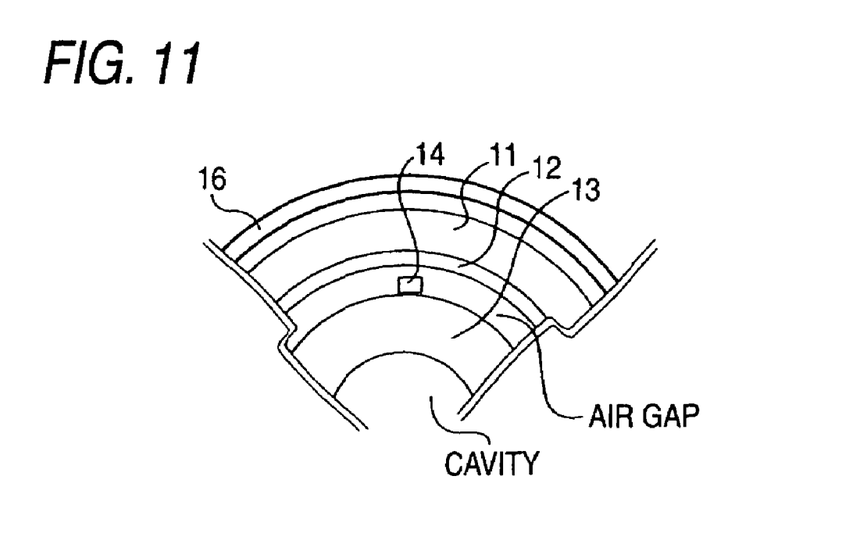
FIG. 11 is a cross-sectional view taken along line B-B' of FIG. 10.

FIG. 10 is a cross-sectional view showing a structure of a cavity actuator according to a sixth embodiment of the present invention, and FIG. 11 is a cross-sectional view taken along line B-B' of FIG. 10.

In the drawing, reference numeral 16 denotes a magnetic shield.

The present embodiment is different from the fourth embodiment in that the magnetic shield 16 is provided.

The magnetic shield may be, for example, made of a SS material.

When the magnetic field is provided, magnetic field noise from the armature winding 212 and the brake coil 312 can be blocked and a distance between the magnetic encoder and the motor or the electronic brake can be reduced.

SEVENTH EMBODIMENT

Figure 12:
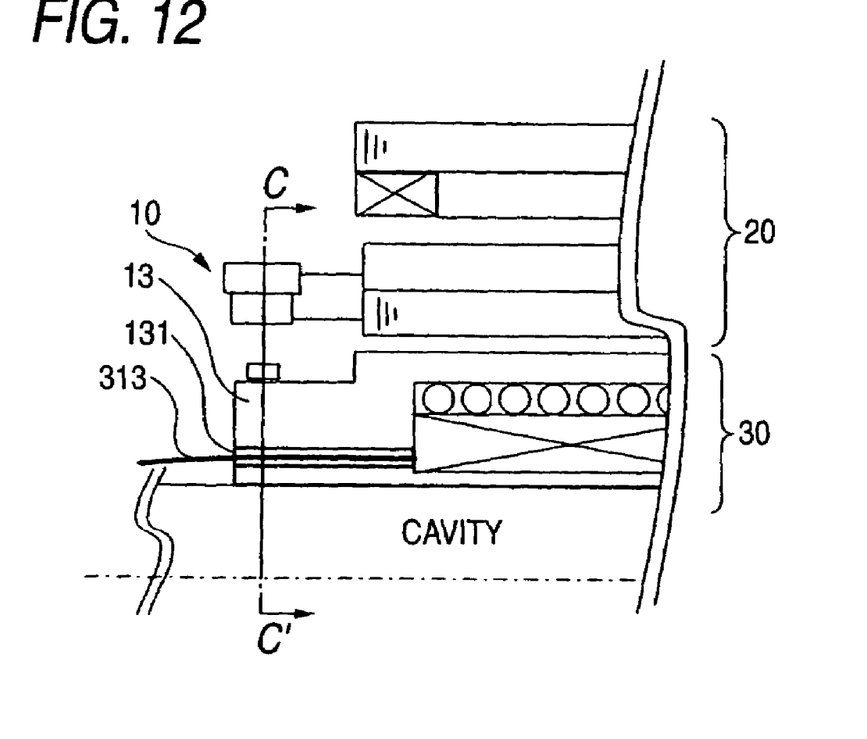
FIG. 12 is a cross-sectional view showing a structure of a cavity actuator according to a seventh embodiment of the present invention.
Figure 13:
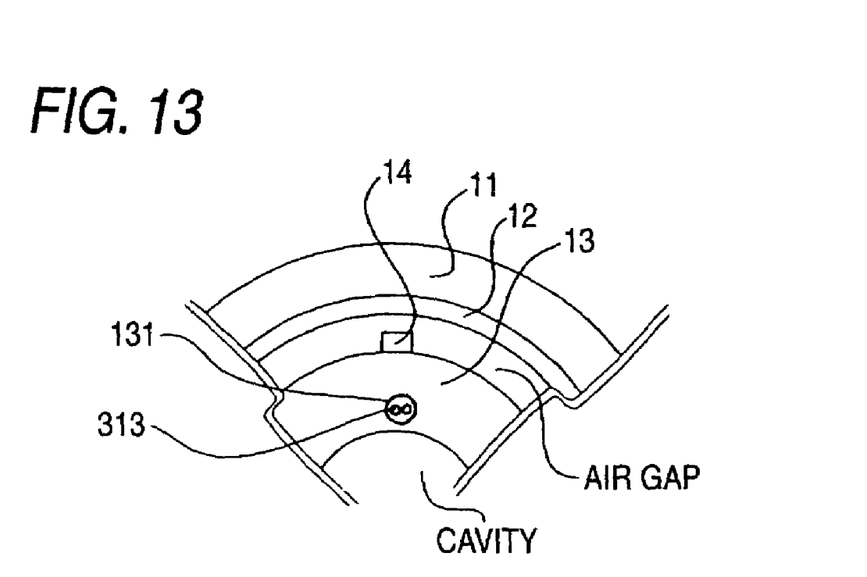
FIG. 13 is a cross-sectional view taken along line C-C' of FIG. 12.

FIG. 12 is a cross-sectional view showing a structure of a cavity actuator according to a seventh embodiment of the present invention, and FIG. 13 is a cross-sectional view taken along line C-C' of FIG. 12.

In the drawing, reference numeral 131 denotes a lead hole formed in the fixed body 13 of the magnetic encoder and reference numeral 313 denotes a power supply lead of the electronic brake. The power supply lead 313 of the electronic brake passes through the lead hole 131. The lead hole is circular and the lead hole 131 is disposed at an inner circumferential side of the fixed body 13 on a line for connecting a center of the fixed body 13 to the magnetic field detecting element 14.

In addition, the number of the lead holes may be one. The number of the lead holes may be plural such that magnetic flux distributions of the respective magnetic field detecting elements are in balance. When the plural lead holes are provided, it is preferable that two power supply leads reciprocally pass through a single lead hole. Since the current directions of the two power supply leads in the lead hole are opposite to each other, the magnetic field is suppressed from being generated and thus the magnetic field detecting element can be prevented from being influenced by current flowing in the brake coil.

In the present embodiment is different from the fourth embodiment in that the lead hole 131 through which the power supply lead 313 of the electronic brake 30 passes is provided in the fixed body 13 of the magnetic encoder device 10.

Here, influence of the lead hole on the angle detection signal will be described.

By forming the lead hole in the fixed body 13, magnetic resistance in the vicinity of the lead hole increases and magnetic resistance in the fixed body does not become uniform. To this end, magnetic flux density and magnetic field detection waveform detected by the magnetic field detecting element 14 are influenced and thus precision of the encoder deteriorates. Although the lead hole is formed, when the cross section of the fixed body may be large enough to ignore unevenness of the magnetic resistance, the precision of the encoder does not deteriorate. However, the cavity of the fixed body need be as large as possible. In order to increase the electronic attraction force of the electronic brake, the diameter of the coil line need be large and thus the lead hole need also be large. To this end, it may be actually difficult to avoid the unevenness of the magnetic resistance due to formation of the lead hole. Here, the position of the lead hole by which the precision of the encoder does not deteriorate is examined by magnetic analysis using a finite element method.

Figure 14:
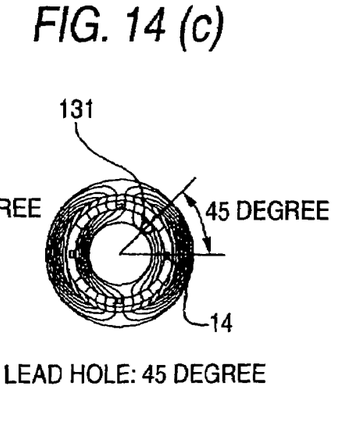
FIG. 14 shows magnetic flux lines for explaining influence of the position of a lead hole on magnetic flux distribution.
Figure 15:
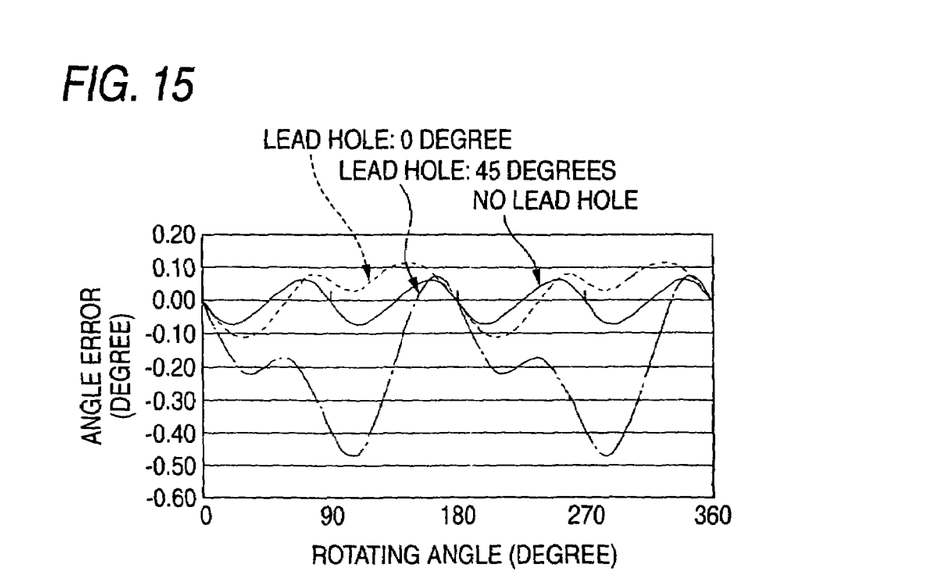
FIG. 15 is a graph showing a relationship between the position of the lead hole and an angle error.

FIG. 14 shows magnetic flux lines for explaining influence of the position of the lead hole on the magnetic flux distribution. FIG. 14 shows magnetic flux distributions a case where the lead hole is not formed and cases where the position angles of the lead hole are 0° and 45° when an angle of a line for connecting the fixed body 13 to the magnetic field detecting element 14 is set to 0°. FIG. 15 is a graph showing a relationship between the position of the lead hole and an angle error. The angle errors when the position angles of the lead hole are 0° and 45° are 1.5 times and 4.0 times of that when the lead hole is not formed, respectively. In other words, it can be seen that, when the lead hole is disposed on a line for connecting the center of the fixed body 13 to the magnetic field detecting element, the deterioration of the precision can be reduced. In addition, the smaller the diameter of the hole, the lower the deterioration of the precision. Furthermore, as the lead hole is formed in the inner circumferential side of the fixed body, the deterioration of the precision is more reduced. It can be seen that, in the same cross-section area of the lead hole, the deterioration of the precision is more reduced when the lead hole is elongated in a circumferential direction.

EIGHTH EMBODIMENT

Figure 16:
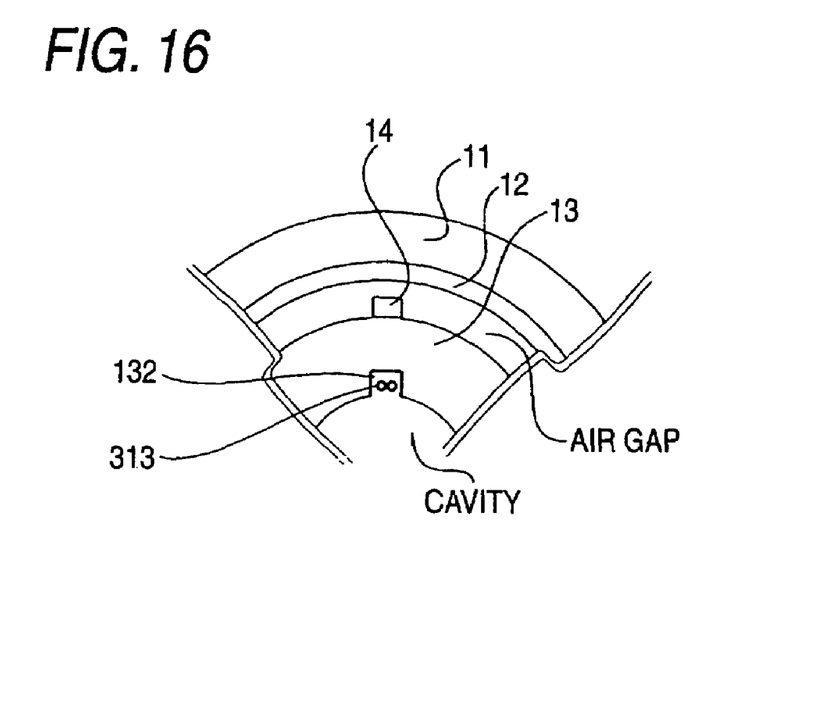
FIG. 16 is a cross-sectional view of a magnetic encoder according to an eighth embodiment of the present invention.

FIG. 16 is a cross-sectional view of a magnetic encoder according to an eighth embodiment of the present invention.

In FIG. 16, reference numeral 133 denotes a notch portion through which a brake power supply lead line 313 of the electronic brake provided in the fixed body 13 passes. The notch portion is disposed on a line for connecting the center of the fixed body 13 to the magnetic field detecting element 14. The shape of the notch portion is rectangular. The present embodiment is different from the eighth embodiment in that the notch portion 132 is formed in the inner circumferential side of the fixed body, instead of the lead hole.

Next, a result of measuring influence of the lead hole on the detection precision will be described.

The magnetic encoder device according to the present invention and a reference encoder device (resolution: 1,050,000 PPR) are coupled to each other and externally rotated and a detection angle of the magnetic encoder device of the present invention and a detection angle of the reference encoder device are measured and compared with each other.

The deterioration of the precision due to the lead hole is 0.12° in the seventh embodiment and is 0.09° in the eighth embodiment. In other words, it can be seen that the deterioration of the precision due to the lead hole is low.

INDUSTRIAL AVAILABILITY

According to a magnetic encoder device according to the present invention, since it is possible to realize the encoder device having a cavity structure, with a small size, slimness, and low cost, the magnetic encoder device can be used for detecting a rotating angle of a cavity actuator used in a robot or the like. In addition, the actuator including the magnetic encoder device according to the present invention can be used in a semiconductor manufacturing apparatus.

The invention claimed is:

1. A magnetic encoder device comprising:
a magnetic encoder including a permanent magnet fixed to a rotating body and a magnetic field detecting element which faces the permanent magnet through an air gap and is fixed to a fixed body, and
a signal processing circuit which processes a signal from the magnetic field detecting element, wherein
the rotating body has a ring shape,
the permanent magnet has a ring shape, is inscribed in and fixed to an inner circumferential side of the rotating body and magnetized in parallel to a direction perpendicular to a center axis of the rotating body,
the fixed body has a circular outer circumference and a cavity and is disposed at an inner circumferential side of the permanent magnet through the air gap, and
the magnetic field detecting element is disposed on an outer circumferential side of the fixed body through the permanent magnet and the air gap.

2. The magnetic encoder device according to claim 1, wherein
the permanent magnet has parallel anisotropy and is magnetized to two poles.

3. The magnetic encoder device according to claim 1, wherein
the rotating body is made of a magnetic material.

4. The magnetic encoder device according to claim 1, wherein
the fixed body is made of a magnetic material.

5. The magnetic encoder device according to claim 4, wherein
the magnetic material is made of sintered soft magnetic powdered material.

6. The magnetic encoder device according to claim 4, wherein
the magnetic material is formed by laminating a soft magnetic material.

7. An actuator having a cavity and including an electronic motor and an electronic brake, wherein
the actuator comprises a magnetic encoder device, the magnetic encoder device further comprises
a magnetic encoder including a permanent magnet fixed to a rotating body and a magnetic field detecting element which faces the permanent magnet through an air gap and is fixed to a fixed body, and
a signal processing circuit which processes a signal from the magnetic field detecting element, wherein
the rotating body has a ring shape,
the permanent magnet has a ring shape, is inscribed in and fixed to an inner circumferential side of the rotating body and magnetized in parallel to a direction perpendicular to a center axis of the rotating body,
the fixed body has a circular outer circumference and a cavity and is disposed at an inner circumferential side of the permanent magnet through the air gap, and
the magnetic field detecting element is disposed on an outer circumferential side of the fixed body through the permanent magnet and the air gap.

8. The actuator according to claim 7, wherein
the fixed body of the magnetic encoder also functions as a portion of a magnetic yoke of the electronic brake.

9. The actuator according to claim 7, wherein
the fixed body of the magnetic encoder has a structure fitted to a magnetic yoke of the electronic brake.

10. The actuator according to claim 7, wherein
a magnetic shield is disposed between the electronic motor or the electronic brake and the magnetic encoder.

11. The actuator according to claim 7, wherein
a lead hole through which a power supply lead of the electronic brake passes is formed in the fixed body of the magnetic encoder.

12. The actuator according to claim 7, wherein
a notch portion through which a power supply lead of the electronic brake passes is formed in an inner circumferential side of the fixed body of the magnetic encoder.

13. The actuator according to claim 11, wherein
the lead hole and the notch portion are disposed on a line for connecting a center of the fixed body to the magnetic field detecting element mounted on the fixed body.

14. The actuator according to claim 11, wherein
the lead hole is disposed at an inner circumferential side of the fixed body.

15. The actuator according to claim 12, wherein
the lead hole and the notch portion are disposed on a line for connecting a center of the fixed body to the magnetic field detecting element mounted on the fixed body.

* * * * *